(12) United States Patent
Hou

(10) Patent No.: US 10,108,234 B1
(45) Date of Patent: Oct. 23, 2018

(54) SHIELDED MOTHERBOARD

(71) Applicant: Nzxt Inc., City of Industry, CA (US)

(72) Inventor: Johnny Hou, City of Industry, CA (US)

(73) Assignee: NZXT INC., City of Industry, CA (US)

( * ) Notice: Subject to any disclaimer, the term of this patent is extended or adjusted under 35 U.S.C. 154(b) by 0 days.

(21) Appl. No.: 15/618,551

(22) Filed: Jun. 9, 2017

(51) Int. Cl.
| H05K 7/20 | (2006.01) |
| H05K 5/00 | (2006.01) |
| G06F 1/20 | (2006.01) |

(52) U.S. Cl.
CPC ............. *G06F 1/20* (2013.01); *H05K 7/2039* (2013.01)

(58) Field of Classification Search
None
See application file for complete search history.

(56) References Cited

U.S. PATENT DOCUMENTS

| D288,803 | S  | * | 3/1987  | Capawana      | D13/182     |
| 5,508,889 | A  | * | 4/1996  | Ii            | H05K 9/0028 |
|           |    |   |         |               | 174/368     |
| 6,023,412 | A  | * | 2/2000  | Morita        | G06F 1/184  |
|           |    |   |         |               | 165/80.3    |
| 6,239,359 | B1 | * | 5/2001  | Lilienthal, II | H05K 9/0028 |
|           |    |   |         |               | 174/370     |
| 6,377,475 | B1 | * | 4/2002  | Reis          | H05K 9/003  |
|           |    |   |         |               | 174/387     |
| 6,504,095 | B1 | * | 1/2003  | Hoffstrom     | H05K 5/0091 |
|           |    |   |         |               | 174/520     |
| 7,262,369 | B1 | * | 8/2007  | English       | H01L 23/04  |
|           |    |   |         |               | 174/370     |
| 7,522,886 | B2 | * | 4/2009  | Koh           | H05K 1/0218 |
|           |    |   |         |               | 361/718     |
| 7,643,292 | B1 | * | 1/2010  | Chen          | G06F 1/20   |
|           |    |   |         |               | 361/694     |
| 7,889,503 | B2 | * | 2/2011  | Nagareda      | H01L 23/467 |
|           |    |   |         |               | 165/185     |
| 8,809,697 | B2 | * | 8/2014  | Nicol         | H05K 7/20127|
|           |    |   |         |               | 174/377     |
| 9,516,795 | B2 | * | 12/2016 | Moore, Jr.    | H05K 9/0026 |
| 9,823,718 | B2 | * | 11/2017 | Platt         | G06F 1/203  |
| 2003/0169583 | A1 | * | 9/2003 | Watanabe     | H05K 9/0028 |
|           |    |   |         |               | 361/818     |
| 2005/0236171 | A1 | * | 10/2005 | Garcia       | H05K 9/0032 |
|           |    |   |         |               | 174/387     |
| 2008/0113603 | A1 | * | 5/2008 | Atallah       | G06F 1/20   |
|           |    |   |         |               | 454/184     |
| 2008/0192446 | A1 | * | 8/2008 | Hankofer      | H05K 3/301  |
|           |    |   |         |               | 361/752     |

(Continued)

*Primary Examiner* — Xanthia C Cunningham

(74) *Attorney, Agent, or Firm* — Muncy, Geissler, Olds & Lowe, P.C.

(57) ABSTRACT

A shielded motherboard includes a circuit board, a first metal cover and a second metal cover. The circuit board is provided with a plurality of slots, a central processor, a chip set, a plurality of storage devices, a power supply module, a plurality of I/O ports and a plurality of connectors thereon. The first metal cover is penetrated with a plurality of openings, and a side of the first metal cover is recessed to form a notch. The first metal cover covers the circuit board. The notch exposes the central processor, the power supply module and the I/O ports, and the openings expose the slots, the chip set, the storage devices and the connectors. The second metal cover is arranged on the circuit board to shield the I/O ports.

17 Claims, 5 Drawing Sheets

(56) References Cited

U.S. PATENT DOCUMENTS

| | | | | |
|---|---|---|---|---|
| 2011/0128702 A1* | 6/2011 | Yu | .............................. | G06F 1/18 |
| | | | | 361/695 |
| 2012/0257356 A1* | 10/2012 | Yen | .................... | H05K 7/20454 |
| | | | | 361/720 |
| 2013/0094140 A1* | 4/2013 | Yen | .......................... | G06F 1/20 |
| | | | | 361/679.48 |
| 2015/0230362 A1* | 8/2015 | Kobayashi | ............. | H05K 3/301 |
| | | | | 361/709 |
| 2016/0135282 A1* | 5/2016 | Hata | ................... | H05K 1/0207 |
| | | | | 361/720 |
| 2016/0270265 A1* | 9/2016 | Yoshinaga | ......... | H05K 7/20754 |
| 2017/0071076 A1* | 3/2017 | Yu | ....................... | H05K 7/20545 |

* cited by examiner

SHIELDED MOTHERBOARD

BACKGROUND OF THE INVENTION

Field of the Invention

The present invention relates to a motherboard, particularly to a shielded motherboard.

Description of the Related Art

In recent years, with the development of computer technology, a speed that a computer operates endlessly increases. Thus, the heat-dissipation power of electronic components in the computer host endlessly increases. In order to prevent the electronic components from overheating and temporarily or perpetually malfunctioning, how to effectively dissipate the heat generated by the electronic components in the computer host is very important.

In order to obtain the better heat-dissipation efficiency, parts of users directly locate a motherboard of the computer host in a working place rather than in a computer case. However, components of the motherboard are numerous and disordered. It is not beautiful for the components directly exposed to the outside, and the users are difficult to understand how to connect the motherboard to other expanded cards or storage devices. Besides, there are many sharp components on the motherboard. If the sharp components are not shielded, a user easily touches them and gets hurt. In addition, if the electronic components of the motherboard touch a human body or other conduction products, the user will get an electric shock or the electronic components will be damaged.

To overcome the abovementioned problems, the present invention provides a shielded motherboard, so as to solve the afore-mentioned problems of the prior art.

SUMMARY OF THE INVENTION

A primary objective of the present invention is to provide a shielded motherboard, which uses a first metal cover and a second metal cover to protect a circuit board lest dust touches the circuit board to extend the life of the circuit board.

To achieve the abovementioned objectives, the present invention provides a shielded motherboard, which includes a circuit board, a first metal cover and a second metal cover. The circuit board is provided with a plurality of slots, a central processor, a chip set, a plurality of storage devices, a power supply module, a plurality of Input/Output (I/O) ports and a plurality of connectors thereon. The central processor, the power supply module and the plurality of I/O ports are neighbors of each other, and positions of the plurality of I/O ports correspond to a position of an edge of the circuit board. The first metal cover is penetrated with a plurality of openings, and a side of the first metal cover is recessed to form a notch. The first metal cover covers the circuit board, and a position of the notch corresponds to positions of the central processor, the power supply module and the plurality of I/O ports to expose the central processor, the power supply module and the plurality of I/O ports. Positions of the plurality of openings correspond to the plurality of slots, the chip set, the plurality of storage devices and the plurality of connectors to expose the plurality of slots, the chip set, the plurality of storage devices and the plurality of connectors. The second metal cover is arranged on the circuit board to shield the plurality of I/O ports.

In an embodiment of the present invention, the plurality of storage devices further comprises a first storage device and a second storage device, and the plurality of openings further comprises a first opening and a second opening, and positions of the first opening and the second opening respectively correspond to positions of the first storage device and the second storage device to expose the first storage device and the second storage device.

In an embodiment of the present invention, the shielded motherboard further comprises a first metal shielding plate and a second metal shielding plate. A bottom surface of the first metal shielding plate is provided with a plurality of first fasteners. The first metal shielding plate is fixed on the first metal cover using the plurality of first fasteners, so as to shield the first storage device. A bottom surface of the second metal shielding plate is provided with a plurality of second fasteners. The second metal shielding plate is fixed on the first metal cover using the plurality of second fasteners, so as to shield the second storage device.

In an embodiment of the present invention, the shielded motherboard further comprises a third metal shielding plate with a bottom surface thereof provided with a plurality of third fasteners. The third metal shielding plate is fixed on the first metal cover using the plurality of third fasteners. The third metal shielding plate is arranged between the first metal shielding plate and the second metal shielding plate.

In an embodiment of the present invention, the first metal cover, the second metal cover, the first metal shielding plate, the second metal shielding plate and the third metal shielding plate comprise steel.

In an embodiment of the present invention, a top surface of the first metal shielding plate has a logo.

In an embodiment of the present invention, the shielded motherboard further comprises a first heat-dissipation patch and a second heat-dissipation patch. The first heat-dissipation patch is arranged on the bottom surface of the first metal shielding plate. The second heat-dissipation patch is arranged on the bottom surface of the second metal shielding plate.

In an embodiment of the present invention, the shielded motherboard further comprises a L-shaped heat sink arranged on the power supply module. The notch exposes the L-shaped heat sink. The power supply module is arranged between the plurality of I/O ports and the central processor. The power supply module has a shape of L.

In an embodiment of the present invention, the L-shaped heat sink comprises aluminum.

In an embodiment of the present invention, the L-shaped heat sink further comprises an L-shaped substrate and a plurality of heat-dissipation plates. A bottom surface of the L-shaped substrate has a central region extending downwardly to form a flange. The flange is arranged on the power supply module. The plurality of heat-dissipation plates is spaced and neighbored. The plurality of heat-dissipation plates is vertically connected with a top surface of the L-shaped substrate.

In an embodiment of the present invention, the shielded motherboard further comprises an L-shaped heat-dissipation cover penetrated with a plurality of first heat-dissipation holes arranged into a plurality of columns. Sizes of the plurality of first heat-dissipation holes of each column are sequentially reduced. A bottom surface of the L-shaped heat-dissipation cover is provided with a plurality of fourth fasteners. The L-shaped heat-dissipation cover is fixed on the L-shaped substrate using the plurality of fourth fasteners. The L-shaped heat-dissipation cover shields the plurality of heat-dissipation plates.

In an embodiment of the present invention, the plurality of openings further comprises a third opening, a fourth opening, a fifth opening, a sixth opening and a seventh opening, and the plurality of connectors further comprises a first connector, a second connector, a third connector and a fourth connector, and the plurality of slots further comprises a first slot, a second slot, a third slot, a fourth slot, a fifth slot and a sixth slot. The first connector, the first slot and the first storage device are neighbors of each other, and the second slot and the second storage device are neighbors of each other, and the second connector is arranged between the second slot and the first slot, and the second slot is arranged between the second connector and the third connector, and the third slot, the fourth slot, the fifth slot and the sixth slot are neighbors of each other. A position of the first opening corresponds to positions of the first connector and the first slot to expose the first connector and the first slot, and a position of the second opening corresponds to a position of the second slot to expose the second slot, and a position of the third opening corresponds to a position of the second connector to expose the second connector, and a position of the fourth opening corresponds to a position of the third connector to expose the third connector, and a position of the fifth opening corresponds to positions of the third slot, the fourth slot, the fifth slot and the sixth slot to expose the third slot, the fourth slot, the fifth slot and the sixth slot, and a position of the sixth opening corresponds to a position of the fourth connector to expose the fourth connector, and a position of the seventh opening corresponds to a position of the chip set to expose the chip set.

In an embodiment of the present invention, the first slot, the second slot, the third slot, the fourth slot, the fifth slot and the sixth slot are accelerated graphics port (AGP) slots, peripheral component interconnect (PCI) slots, or peripheral component interconnect express (PCI-E) slots, and the first storage device and the second storage device are solid state disk (SSD), and the first connector, the second connector, the third connector and the fourth connector are data cable connectors or power cable connectors.

In an embodiment of the present invention, the shielded motherboard further comprises a square heat sink arranged on the chip set, and the sixth opening exposes the square heat sink, and the chip set has a shape of square.

In an embodiment of the present invention, the square heat sink comprises aluminum.

In an embodiment of the present invention, the square heat sink further comprises a square substrate and a plurality of heat-dissipation columns. The square substrate is arranged on the chip set. The plurality of heat-dissipation columns is neighbored and spaced, and the plurality of heat-dissipation columns is vertically connected with a top surface of the square substrate.

In an embodiment of the present invention, the shielded motherboard further comprises a square heat-dissipation cover penetrated with a plurality of second heat-dissipation holes, and the plurality of second heat-dissipation holes is arranged into a plurality of columns. Sizes of the plurality of second heat-dissipation holes of each column are sequentially reduced, and a bottom surface of the square heat-dissipation cover is provided with a plurality of fifth fasteners. The first metal cover is penetrated with a plurality of opening holes, and positions of the plurality of opening holes respectively correspond to positions of the plurality of fifth fasteners, and the circuit board is further provided with a plurality of sixth fasteners, and positions of the plurality of sixth fasteners respectively correspond to the positions of the plurality of opening holes, and the plurality of fifth fasteners is combined with the plurality of sixth fasteners through the plurality of opening holes, so as to fix the square heat-dissipation cover to the circuit board, and the square heat-dissipation cover shields the plurality of heat-dissipation columns.

In an embodiment of the present invention, the first metal cover is further penetrated with a plurality of first fixed holes, and the circuit board is further penetrated with a plurality of second fixed holes, and positions of the plurality of first fixed holes respectively correspond to positions of the plurality of second fixed holes. Each first fixed hole and the second fixed hole corresponded thereof are inserted with a bolt, so as to fix the first metal cover to the circuit board.

In an embodiment of the present invention, the bolt has a thread therein, and the bolt is inserted with a screw, and the screw is fixed in the bolt using the thread.

Below, the embodiments are described in detail in cooperation with the drawings to make easily understood the technical contents, characteristics and accomplishments of the present invention.

DETAILED DESCRIPTION OF THE INVENTION

Figure 1:
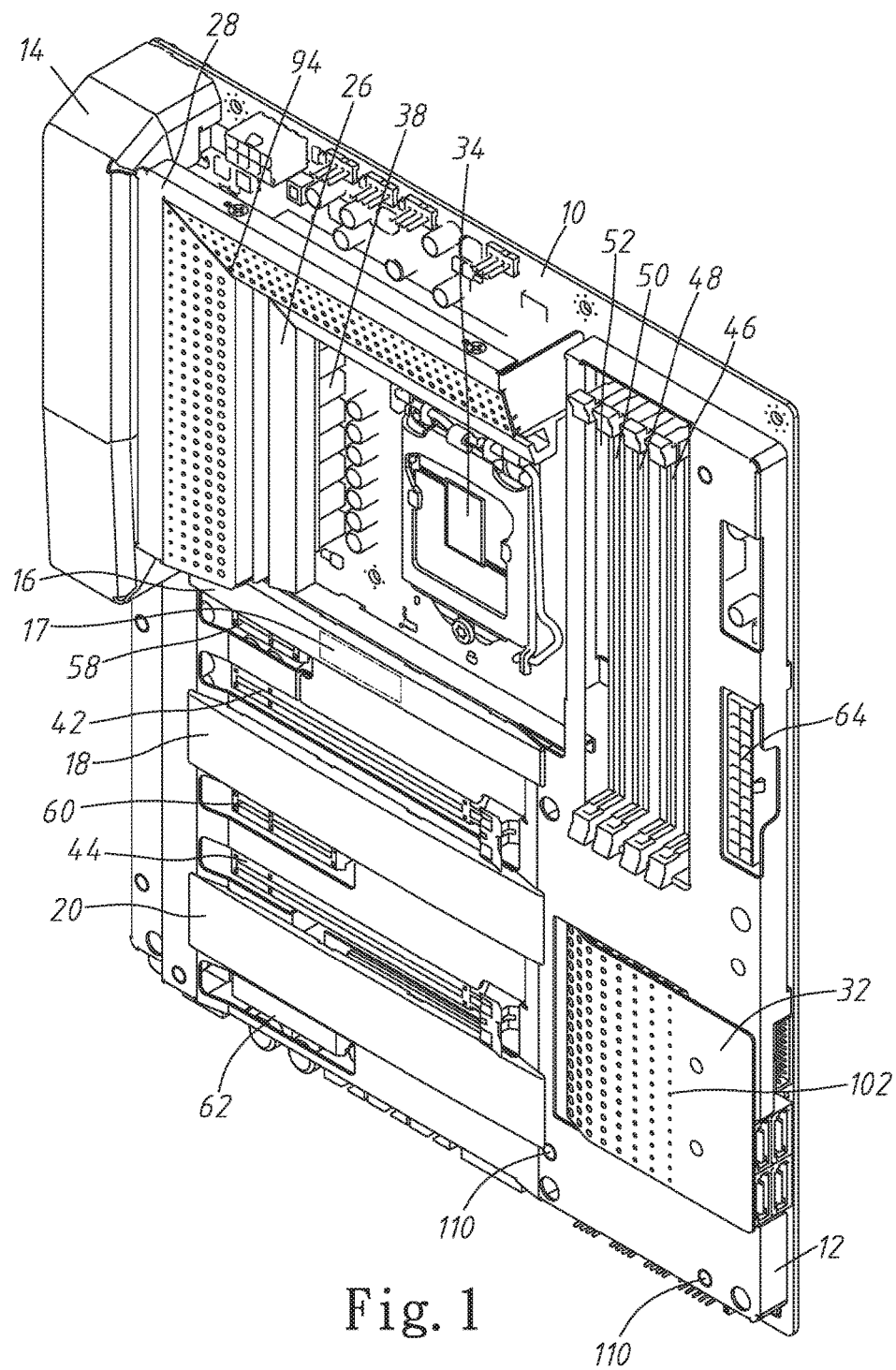
FIG. 1 is a perspective view of a shielded motherboard according to an embodiment of the present invention.
Figure 2:
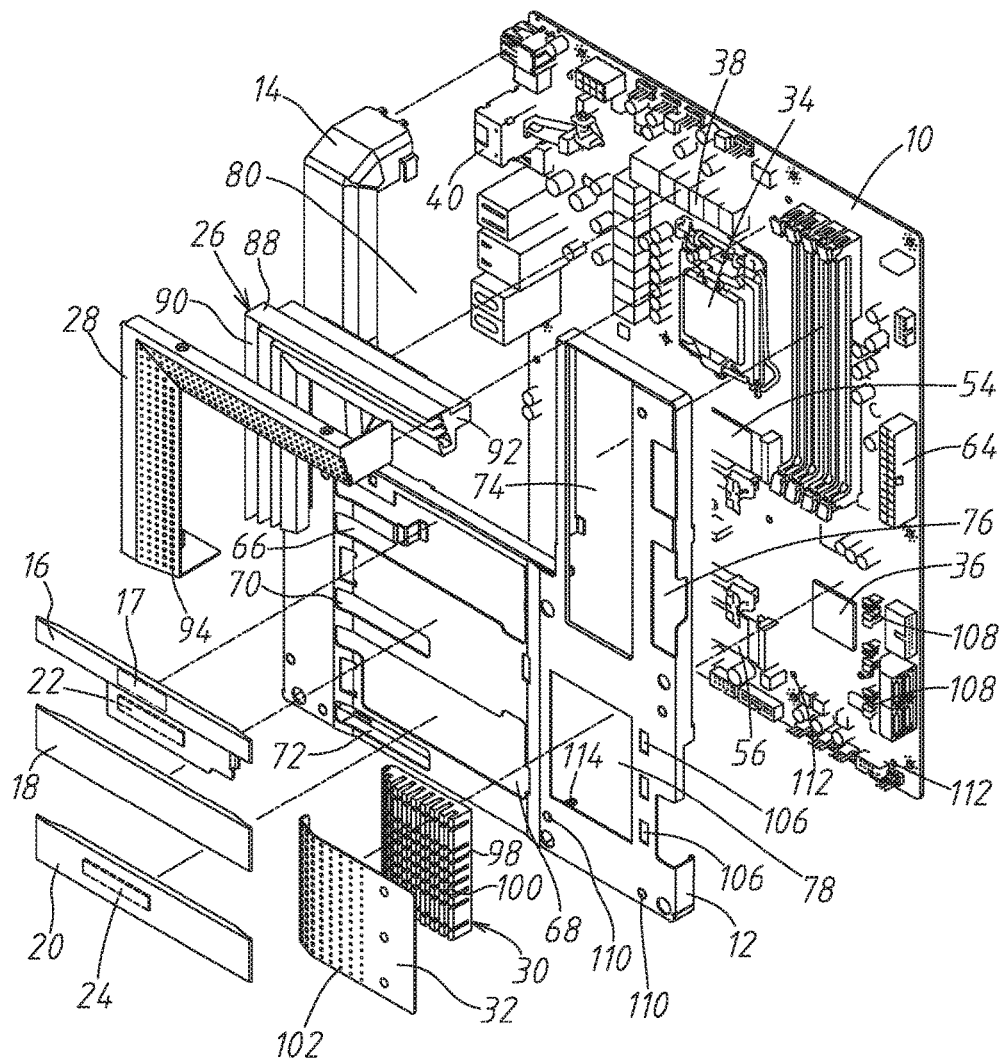
FIG. 2 is an exploded view of a shielded motherboard according to an embodiment of the present invention.
Figure 3:
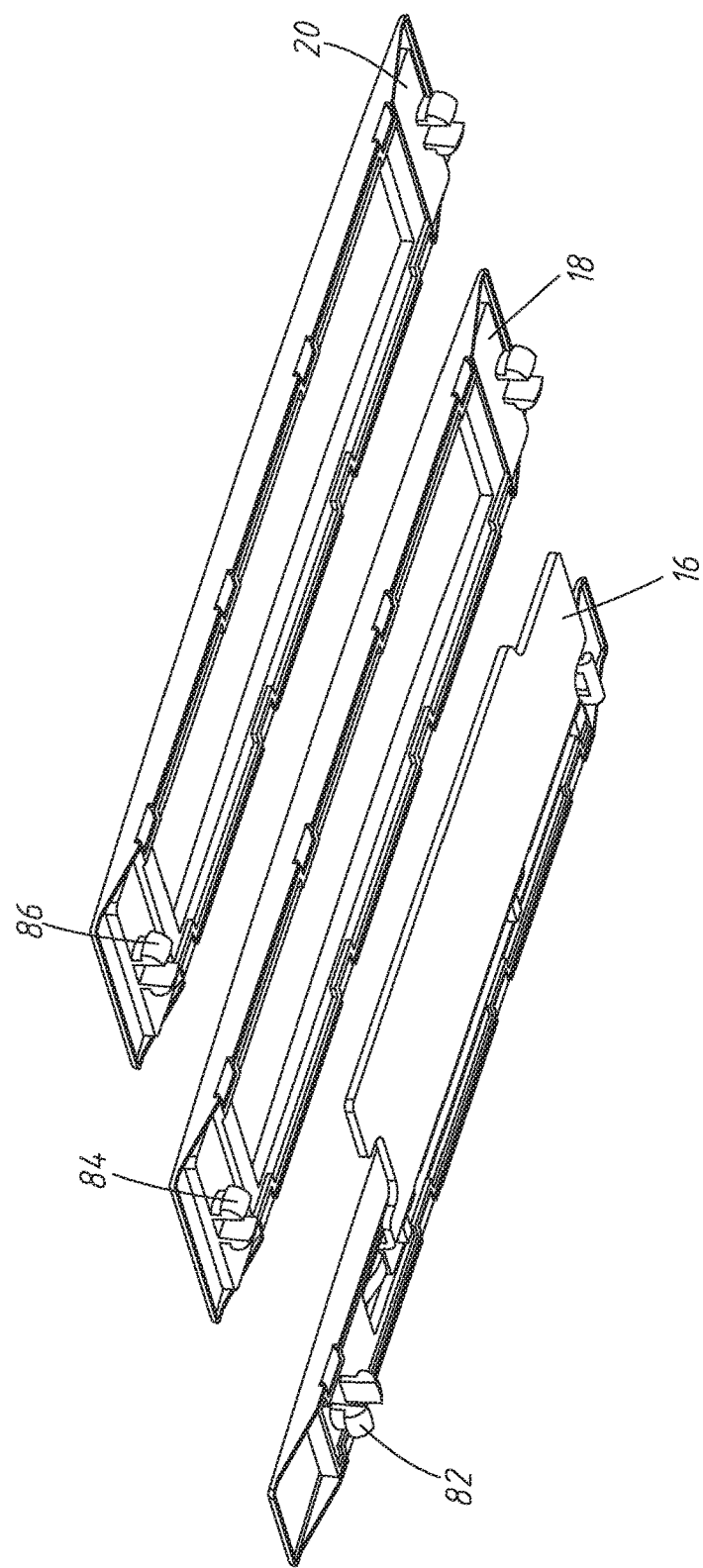
FIG. 3 is perspective views of a first metal shielding plate, a second metal shielding plate and a third shielding plate according to an embodiment of the present invention.
Figure 4:
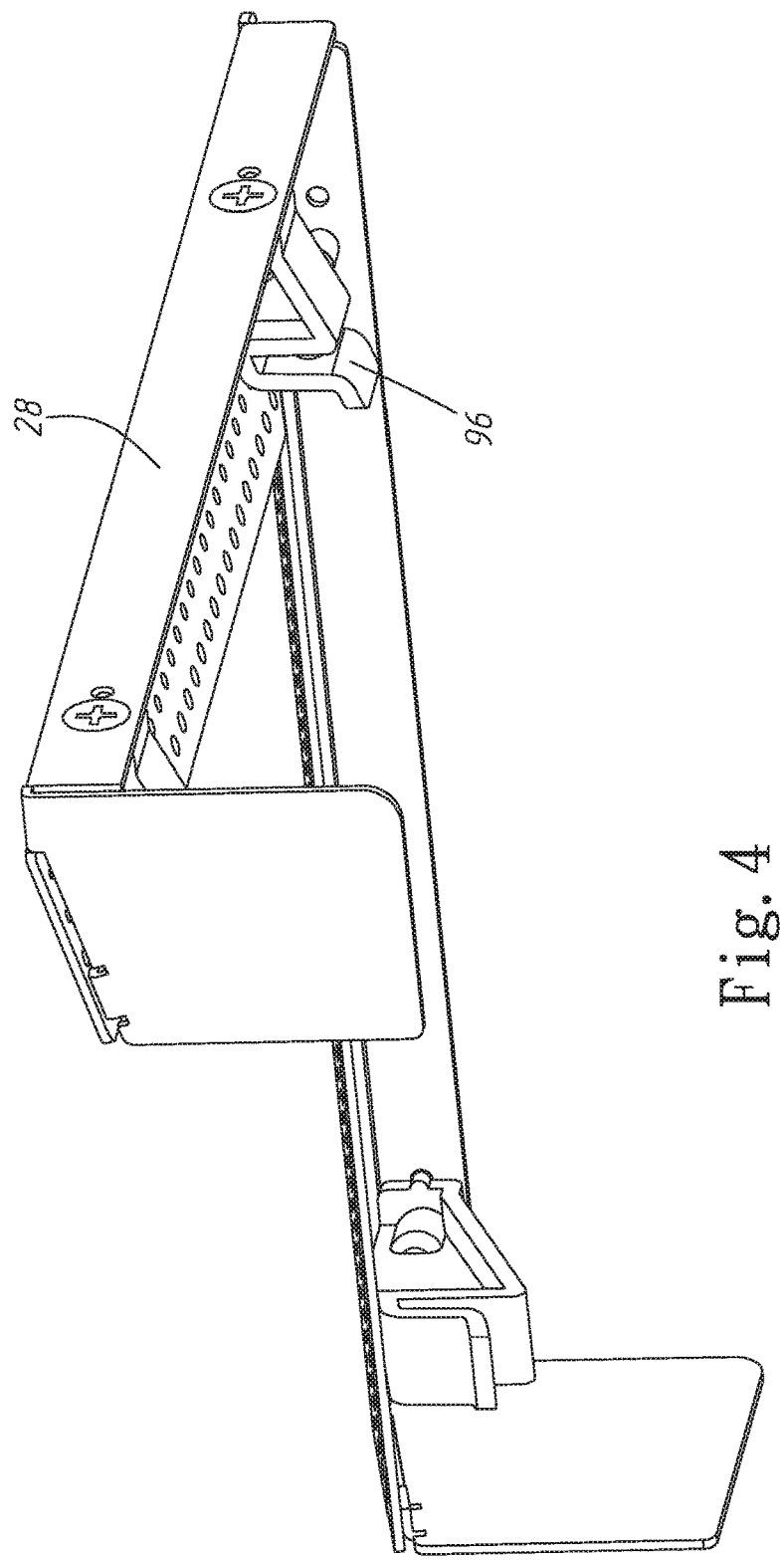
FIG. 4 is a perspective view of an L-shaped heat-dissipation cover according to an embodiment of the present invention.
Figure 5:
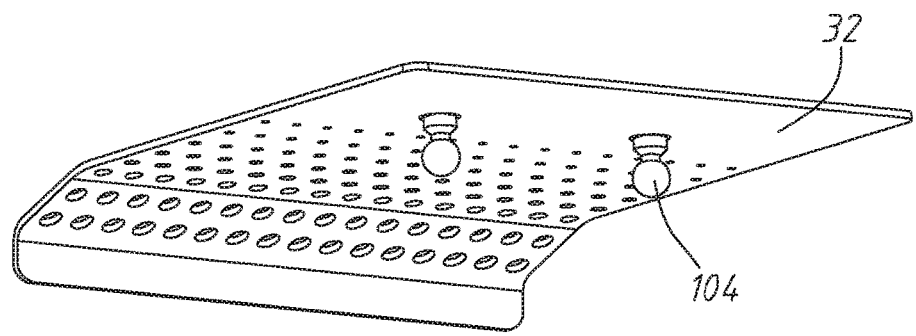
FIG. 5 is a perspective view of a square heat-dissipation cover according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Refer to FIG. 1, FIG. 2, FIG. 3, FIG. 4 and FIG. 5. The shielded motherboard of the present invention is introduced. The shielded motherboard of the present invention comprises a circuit board 10, a first metal cover 12, a second metal cover 14, a first metal shielding plate 16, a second metal shielding plate 18, a third metal shielding plate 20, a first heat-dissipation patch 22, a second heat-dissipation patch 24, an L-shaped heat sink 26, an L-shaped heat-dissipation cover 28, a square heat sink 30 and a square heat-dissipation cover 32. The circuit board 10 is provided with a plurality of slots, a central processor 34, a chip set 36, a plurality of storage devices, a power supply module 38, a plurality of Input/Output (I/O) ports 40 and a plurality of connectors thereon. The power supply module 38 provides power for the central processor 34 and the chip set 36. The plurality of slots comprises a first slot 42, a second slot 44, a third slot 46, a fourth slot 48, a fifth slot 50 and a sixth slot 52. The plurality of storage devices comprises a first storage device 54 and a second storage device 56. The plurality of connectors comprises a first connector 58, a second connector 60, a third connector 62 and a fourth connector 64. The central processor 34, the power supply module 38 and the plurality of I/O ports 40 are neighbors of each other. Positions of the plurality of I/O ports 40 correspond to a position of an edge of the circuit board 10. The first metal cover 12 is penetrated with a plurality of openings, which comprises a first opening 66, a second opening 68, a third opening 70, a four opening 72, a fifth opening 74, a sixth opening 76 and a seventh opening 78. A side of the first metal cover 12 is recessed to form a notch 80. The first metal cover 12 covers the circuit board 10. A position of the notch 80 corresponds to positions of the central processor 34, the power supply module 38 and the plurality of I/O ports 40 to expose the central processor 34, the power supply module 38 and the plurality of I/O ports 40. Positions of the plurality of openings correspond to the plurality of slots, the chip set 36, the plurality of storage devices and the plurality of connectors to expose the plurality of slots, the chip set 36, the plurality of storage devices and the plurality of connectors. The second metal cover 14 is arranged on the circuit board 10 to shield the plurality of I/O ports 40. The present invention uses the first metal cover 12 and the second metal cover 14 to protect the circuit board 10 lest dust touches the circuit board 10 to extend the life of the circuit board 10.

The first connector 58, the first slot 42 and the first storage device 54 are neighbors of each other, and the second slot 44 and the second storage device 56 are neighbors of each other. The second connector 60 is arranged between the first slot 42 and the second slot 44. The second slot 44 is arranged between the second connector 60 and the third connector 62. The third slot 46, the fourth slot 48, the fifth slot 50 and the sixth slot 52 are neighbors of each other. A position of the first opening 66 corresponds to positions of the first storage device 54, the first connector 58 and the first slot 42 to expose the first storage device 54, the first connector 58 and the first slot 42. A position of the second opening 68 corresponds to positions of the second storage device 56 and the second slot 44 to expose the second storage device 56 and the second slot 44. A position of the third opening 70 corresponds to a position of the second connector 60 to expose the second connector 60. A position of the fourth opening 72 corresponds to a position of the third connector 62 to expose the third connector 62. A position of the fifth opening 74 corresponds to positions of the third slot 46, the fourth slot 48, the fifth slot 50 and the sixth slot 52 to expose the third slot 46, the fourth slot 48, the fifth slot 50 and the sixth slot 52. A position of the sixth opening 76 corresponds to a position of the fourth connector 64 to expose the fourth connector 64. A position of the seventh opening 78 corresponds to a position of the chip set 36 to expose the chip set 36. Besides, the first slot 42, the second slot 44, the third slot 46, the fourth slot 48, the fifth slot 50 and the sixth slot 52 are accelerated graphics port (AGP) slots, peripheral component interconnect (PCI) slots, or peripheral component interconnect express (PCI-E) slots, and the first storage device 54 and the second storage device 56 are solid state disk (SSD), and the first connector 58, the second connector 60, the third connector 62 and the fourth connector 64 are data cable connectors or power cable connectors.

A bottom surface of the first metal shielding plate 16 is provided with a plurality of first fasteners 82. The first metal shielding plate 16 is fixed on the first metal cover 12 using the plurality of first fasteners 82, so as to shield the first storage device 54. A bottom surface of the second metal shielding plate 18 is provided with a plurality of second fasteners 84. The second metal shielding plate 18 is fixed on the first metal cover 12 using the plurality of second fasteners 84, so as to shield the second storage device 56. A bottom surface of the third metal shielding plate 20 is provided with a plurality of third fasteners 86. The third metal shielding plate 20 is fixed on the first metal cover 12 using the plurality of third fasteners 86. The third metal shielding plate 20 is arranged between the first metal shielding plate 16 and the second metal shielding plate 18. Since the circuit board 10 is made of fiber glass reinforced plastics (FRP), the circuit board 10 is softer. In order to strengthen the structure of the circuit board 10, the first metal cover 12, the second metal cover 14, the first metal shielding plate 16, the second metal shielding plate 18 and the third metal shielding plate 20 comprise steel, so that the circuit board 10 support the heavier components. A top surface of the first metal shielding plate 16 has a logo 17 for decoration. In order to dissipate the heat generated by the first storage device 54 and the second storage device 56, the first heat-dissipation patch 22 and the second heat-dissipation patch 24 are respectively arranged on the bottom surfaces of the first metal shielding plate 16 and the second metal shielding plate 18.

The L-shaped heat sink 26 is arranged on the power supply module 38. The notch 80 exposes the L-shaped heat sink 26. The power supply module 38 is arranged between the plurality of I/O ports 40 and the central processor 34. The power supply module 38 has a shape of L, and the L-shaped heat sink 26 comprises aluminum. The L-shaped heat sink 26 further comprises an L-shaped substrate 88 and a plurality of heat-dissipation plates 90. A bottom surface of the L-shaped substrate 88 has a central region extending downwardly to form a flange 92. The flange 92 is arranged on the power supply module 38. The plurality of heat-dissipation plates 90 is spaced and neighbored. The plurality of heat-dissipation plates 90 is vertically connected with a top surface of the L-shaped substrate 88. The L-shaped heat-dissipation cover 28 is penetrated with a plurality of first heat-dissipation holes 94 arranged into a plurality of columns. Sizes of the plurality of first heat-dissipation holes 94 of each column are sequentially reduced. A bottom surface of the L-shaped heat-dissipation cover 28 is provided with a plurality of fourth fasteners 96. The L-shaped heat-dissipation cover 28 is fixed on the L-shaped substrate 88 using the plurality of fourth fasteners 96. The L-shaped heat-dissipation cover 28 shields the plurality of heat-dissipation plates 90. The L-shaped heat-dissipation cover 28 also comprises aluminum.

The square heat sink 30 is arranged on the chip set 36, and the sixth opening 76 exposes the square heat sink 30, and the chip set 36 has a shape of square. The square heat sink 30 comprises aluminum. The square heat sink 30 further comprises a square substrate 98 and a plurality of heat-dissipation columns 100. The square substrate 98 is arranged on the chip set 36. The plurality of heat-dissipation columns 100 is neighbored and spaced, and the plurality of heat-dissipation columns 100 is vertically connected with a top surface of the square substrate 98. The square heat-dissipation cover 32 is penetrated with a plurality of second heat-dissipation holes 102, and the plurality of second heat-dissipation holes 102 is arranged into a plurality of columns. Sizes of the plurality of second heat-dissipation holes 102 of each column are sequentially reduced, and a bottom surface of the square heat-dissipation cover 32 is provided with a plurality of fifth fasteners 104. The first metal cover 12 is penetrated with a plurality of opening holes 106, and positions of the plurality of opening holes 106 respectively correspond to positions of the plurality of fifth fasteners 104. The circuit board 10 is further provided with a plurality of sixth fasteners 108, and positions of the plurality of sixth fasteners 108 respectively correspond to the positions of the plurality of opening holes 106, and the plurality of fifth fasteners 104 is combined with the plurality of sixth fasteners 108 through the plurality of opening holes 106, so as to fix the square heat-dissipation cover 32 to the circuit board 10, and the square heat-dissipation cover 32 shields the plurality of heat-dissipation columns 100. The square heat-dissipation cover 32 also comprises aluminum.

Figure 6:
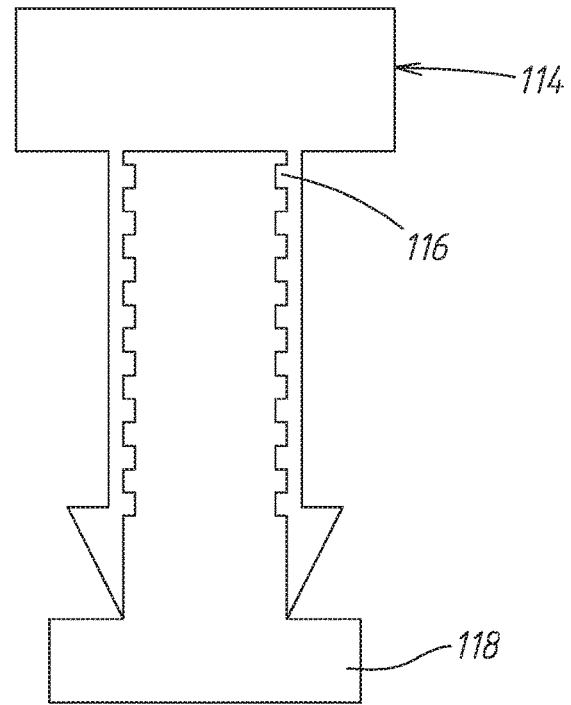
FIG. 6 is a diagram schematically showing a screw inserted into a bolt according to the second embodiment of the present invention.

The first metal cover 12 is further penetrated with a plurality of first fixed holes 110, and the circuit board 10 is further penetrated with a plurality of second fixed holes 112, and positions of the plurality of first fixed holes 110 respectively correspond to positions of the plurality of second fixed holes 112. Each first fixed hole 110 and the second fixed hole 112 corresponded thereof are inserted with a bolt 114, so as to fix the first metal cover 12 to the circuit board 10. When a user disassembles the first metal cover 12, the bolt 114 is easily replaced to achieve fast disassembly. Refer to FIG. 6. The bolt 114 has a thread 116 therein, and the bolt 114 is inserted with a screw 118, and the screw 118 is fixed in the bolt 114 using the thread 116. If the user intends to enhance the stability for the first metal cover 12 and the circuit board 10, the screw 118 is fixed in the bolt 114.

In conclusion, the present invention uses the first metal cover and the second metal cover to protect the circuit board lest dust touches the circuit board to extend the life of the circuit board.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A shielded motherboard comprising:
   a circuit board provided with a plurality of slots, a central processor, a chip set, a plurality of storage devices, a power supply module, a plurality of Input/Output (I/O) ports and a plurality of connectors thereon, and said central processor, said power supply module and said plurality of I/O ports are neighbors of each other, and positions of said plurality of I/O ports correspond to a position of an edge of said circuit board;
   a first metal cover penetrated with a plurality of openings, and a side of said first metal cover is recessed to form a notch, and said first metal cover covers said circuit board, and a position of said notch corresponds to positions of said central processor, said power supply module and said plurality of I/O ports to expose said central processor, said power supply module and said plurality of I/O ports, and positions of said plurality of openings correspond to said plurality of slots, said chip set, said plurality of storage devices and said plurality of connectors to expose said plurality of slots, said chip set, said plurality of storage devices and said plurality of connectors;
   a second metal cover arranged on said circuit board to shield said plurality of I/O ports, said plurality of storage devices further comprises a first storage device and a second storage device, said plurality of openings further comprises a first opening and a second opening, and positions of said first opening and said second opening respectively correspond to positions of said first storage device and said second storage device to expose said first storage device and said second storage device;
   a first metal shielding plate with a bottom surface thereof provided with a plurality of first fasteners, and said first metal shielding plate is fixed on said first metal cover using said plurality of first fasteners, so as to shield said first storage device; and
   a second metal shielding plate with a bottom surface thereof provided with a plurality of second fasteners, and said second metal shielding plate is fixed on said first metal cover using said plurality of second fasteners, so as to shield said second storage device.

2. The shielded motherboard according to claim 1, further comprising a third metal shielding plate with a bottom surface thereof provided with a plurality of third fasteners, and said third metal shielding plate is fixed on said first metal cover using said plurality of third fasteners, and said third metal shielding plate is arranged between said first metal shielding plate and said second metal shielding plate.

3. The shielded motherboard according to claim 2, wherein said first metal cover, said second metal cover, said first metal shielding plate, said second metal shielding plate and said third metal shielding plate comprise steel.

4. The shielded motherboard according to claim 2, further comprising a L-shaped heat sink arranged on said power supply module, and said notch exposes said L-shaped heat sink, and said power supply module is arranged between said plurality of I/O ports and said central processor, and said power supply module has a shape of L.

5. The shielded motherboard according to claim 4, wherein said L-shaped heat sink comprises aluminum.

6. The shielded motherboard according to claim 4, wherein said L-shaped heat sink further comprises:
   an L-shaped substrate with a bottom surface thereof having a central region extending downwardly to form a flange, and said flange is arranged on said power supply module; and
   a plurality of heat-dissipation plates spaced and neighbored, and said plurality of heat-dissipation plates is vertically connected with a top surface of said L-shaped substrate.

7. The shielded motherboard according to claim 6, further comprising an L-shaped heat-dissipation cover penetrated with a plurality of first heat-dissipation holes arranged into a plurality of columns, and sizes of said plurality of first heat-dissipation holes of each said column are sequentially reduced, and a bottom surface of said L-shaped heat-dissipation cover is provided with a plurality of fourth fasteners, and said L-shaped heat-dissipation cover is fixed on said L-shaped substrate using said plurality of fourth fasteners, and said L-shaped heat-dissipation cover shields said plurality of heat-dissipation plates.

8. The shielded motherboard according to claim 7, wherein said plurality of openings further comprises a third opening, a fourth opening, a fifth opening, a sixth opening and a seventh opening, and said plurality of connectors further comprises a first connector, a second connector, a third connector and a fourth connector, and said plurality of slots further comprises a first slot, a second slot, a third slot, a fourth slot, a fifth slot and a sixth slot, and said first connector, said first slot and said first storage device are neighbors of each other, and said second slot and said second storage device are neighbors of each other, and said second connector is arranged between said second slot and said first slot, and said second slot is arranged between said second connector and said third connector, and said third slot, said fourth slot, said fifth slot and said sixth slot are neighbors of each other, and a position of said first opening corresponds to positions of said first connector and said first slot to expose said first connector and said first slot, and a position of said second opening corresponds to a position of said second slot to expose said second slot, and a position of said third opening corresponds to a position of said second connector to expose said second connector, and a position of said fourth opening corresponds to a position of said third connector to expose said third connector, and a position of said fifth opening corresponds to positions of said third slot, said fourth slot, said fifth slot and said sixth slot to expose said third slot, said fourth slot, said fifth slot and said sixth slot, and a position of said sixth opening corresponds to a position of said fourth connector to expose said fourth connector, and a position of said seventh opening corresponds to a position of said chip set to expose said chip set.

9. The shielded motherboard according to claim 8, wherein said first slot, said second slot, said third slot, said fourth slot, said fifth slot and said sixth slot are accelerated graphics port (AGP) slots, peripheral component interconnect (PCI) slots, or peripheral component interconnect express (PCI-E) slots, and said first storage device and said second storage device are solid state disk (SSD), and said first connector, said second connector, said third connector and said fourth connector are data cable connectors or power cable connectors.

10. The shielded motherboard according to claim 8, further comprising a square heat sink arranged on said chip set, and said sixth opening exposes said square heat sink, and said chip set has a shape of square.

11. The shielded motherboard according to claim 10, wherein said square heat sink comprises aluminum.

12. The shielded motherboard according to claim 10, wherein said square heat sink further comprises:
    a square substrate arranged on said chip set; and
    a plurality of heat-dissipation columns neighbored and spaced, and said plurality of heat-dissipation columns is vertically connected with a top surface of said square substrate.

13. The shielded motherboard according to claim 12, further comprising a square heat-dissipation cover penetrated with a plurality of second heat-dissipation holes, and said plurality of second heat-dissipation holes is arranged into a plurality of columns, and sizes of said plurality of second heat-dissipation holes of each said column are sequentially reduced, and a bottom surface of said square heat-dissipation cover is provided with a plurality of fifth fasteners, and said first metal cover is penetrated with a plurality of opening holes, and positions of said plurality of opening holes respectively correspond to positions of said plurality of fifth fasteners, and said circuit board is further provided with a plurality of sixth fasteners, and positions of said plurality of sixth fasteners respectively correspond to said positions of said plurality of opening holes, and said plurality of fifth fasteners is combined with said plurality of sixth fasteners through said plurality of opening holes, so as to fix said square heat-dissipation cover to said circuit board, and said square heat-dissipation cover shields said plurality of heat-dissipation columns.

14. The shielded motherboard according to claim 1, wherein a top surface of said first metal shielding plate has a logo.

15. The shielded motherboard according to claim 1, further comprising:
    a first heat-dissipation patch arranged on said bottom surface of said first metal shielding plate; and
    a second heat-dissipation patch arranged on said bottom surface of said second metal shielding plate.

16. The shielded motherboard according to claim 1, wherein said first metal cover is further penetrated with a plurality of first fixed holes, and said circuit board is further penetrated with a plurality of second fixed holes, and positions of said plurality of first fixed holes respectively correspond to positions of said plurality of second fixed holes, and each said first fixed hole and said second fixed hole corresponded thereof are inserted with a bolt, so as to fix said first metal cover to said circuit board.

17. The shielded motherboard according to claim 16, wherein said bolt has a thread therein, and said bolt is inserted with a screw, and said screw is fixed in said bolt using said thread.

* * * * *